United States Patent [19]

Arcas et al.

[11] Patent Number: 5,025,888
[45] Date of Patent: Jun. 25, 1991

[54] ACOUSTIC LINER

[75] Inventors: Noe Arcas, Plainview; Charles A. Parente, Oyster Bay, both of N.Y.

[73] Assignee: Grumman Aerospace Corporation, Bethpage, N.Y.

[21] Appl. No.: 371,399

[22] Filed: Jun. 26, 1989

[51] Int. Cl.$^5$ .......................... F01N 1/02; F02K 1/00
[52] U.S. Cl. ...................... 181/213; 181/286; 181/288; 181/290; 181/292; 181/293; 244/1 N
[58] Field of Search ............... 181/213, 214, 220, 222, 181/286, 288, 290, 291, 293; 244/1 N

[56] References Cited

U.S. PATENT DOCUMENTS

| | | |
|---|---|---|
| 859,488 | 7/1907 | Dolmetsch . |
| 1,870,323 | 8/1932 | Catteneo . |
| 1,912,161 | 5/1933 | Rosenblatt . |
| 1,925,453 | 9/1933 | Mazer . |
| 1,953,410 | 4/1934 | Jacobson . |
| 2,069,413 | 2/1937 | Leadbetter . |
| 2,091,918 | 8/1937 | Finck . |
| 2,192,516 | 3/1940 | Cunnington . |
| 2,301,538 | 11/1942 | Guyer et al. . |
| 2,326,581 | 8/1943 | Van Cleef . |
| 2,419,971 | 5/1947 | Rumpf et al. ................. 181/290 X |
| 2,442,347 | 6/1948 | Eklund . |
| 2,887,173 | 5/1959 | Boschi . |
| 2,973,295 | 2/1961 | Rodgers, Jr. . |
| 3,061,491 | 10/1962 | Sherrard et al. . |
| 3,115,948 | 12/1963 | Gildard, III et al. . |
| 3,166,149 | 1/1965 | Hulse et al. ................. 181/292 |
| 3,176,789 | 4/1965 | Lighter . |
| 3,380,206 | 4/1968 | Barnett . |
| 3,412,513 | 11/1968 | Gosele . |
| 3,439,774 | 4/1969 | Callaway et al. ............. 181/222 |
| 3,502,171 | 3/1970 | Cowan . |
| 3,507,355 | 4/1970 | Lawson . |
| 3,599,749 | 8/1971 | Millman ..................... 181/220 |
| 3,602,332 | 8/1971 | Hollenbeck . |
| 3,640,357 | 2/1972 | Kitching et al. ............. 181/292 |
| 3,670,843 | 6/1972 | Kelly et al. ................. 181/292 |
| 3,795,288 | 3/1974 | Pall . |
| 3,831,710 | 8/1974 | Wirt ........................... 181/286 |
| 3,844,875 | 10/1974 | Chamberlain, III . |
| 3,913,702 | 10/1975 | Wirt et al. ................... 181/286 |
| 3,948,347 | 4/1976 | Rutledge . |
| 3,960,236 | 6/1976 | Holmes ....................... 181/286 |
| 3,977,492 | 8/1976 | Hankel . |
| 4,111,081 | 9/1978 | Hilliard et al. .............. 181/290 |
| 4,170,674 | 10/1979 | Matsuki ..................... 181/293 X |
| 4,226,299 | 10/1980 | Hansen ....................... 181/286 X |
| 4,275,801 | 6/1981 | Bschorr ...................... 181/290 |
| 4,283,457 | 8/1981 | Kolsky et al. ................ 428/285 |
| 4,421,201 | 12/1983 | Nelsen et al. ................ 181/214 |
| 4,433,751 | 2/1984 | Bonneau ..................... 181/286 X |
| 4,441,581 | 4/1984 | Sommerhalder ............. 181/286 |

FOREIGN PATENT DOCUMENTS 348808 10/1960 Switzerland ................. 181/290

*Primary Examiner*—Benjamin R. Fuller
*Attorney, Agent, or Firm*—Scully, Scott, Murphy & Presser

[57] ABSTRACT

An acoustic liner comprising a sound permeable inside plate forming a first closed annulus, and a sound impermeable outside plate forming a second closed annulus located outside of and extending around the first closed annulus. The inside and outside plates are spaced apart and thus form an annular chamber therebetween; and a core member is secured in this annular chamber, between the inside and outside plates. The core member forms or has the shape of a sine wave form annularly extending around the inside plate, and the core member and the inside plate form a multitude of varying depth sound absorption chambers to attenuate sound waves over a broad band of frequencies.

10 Claims, 3 Drawing Sheets

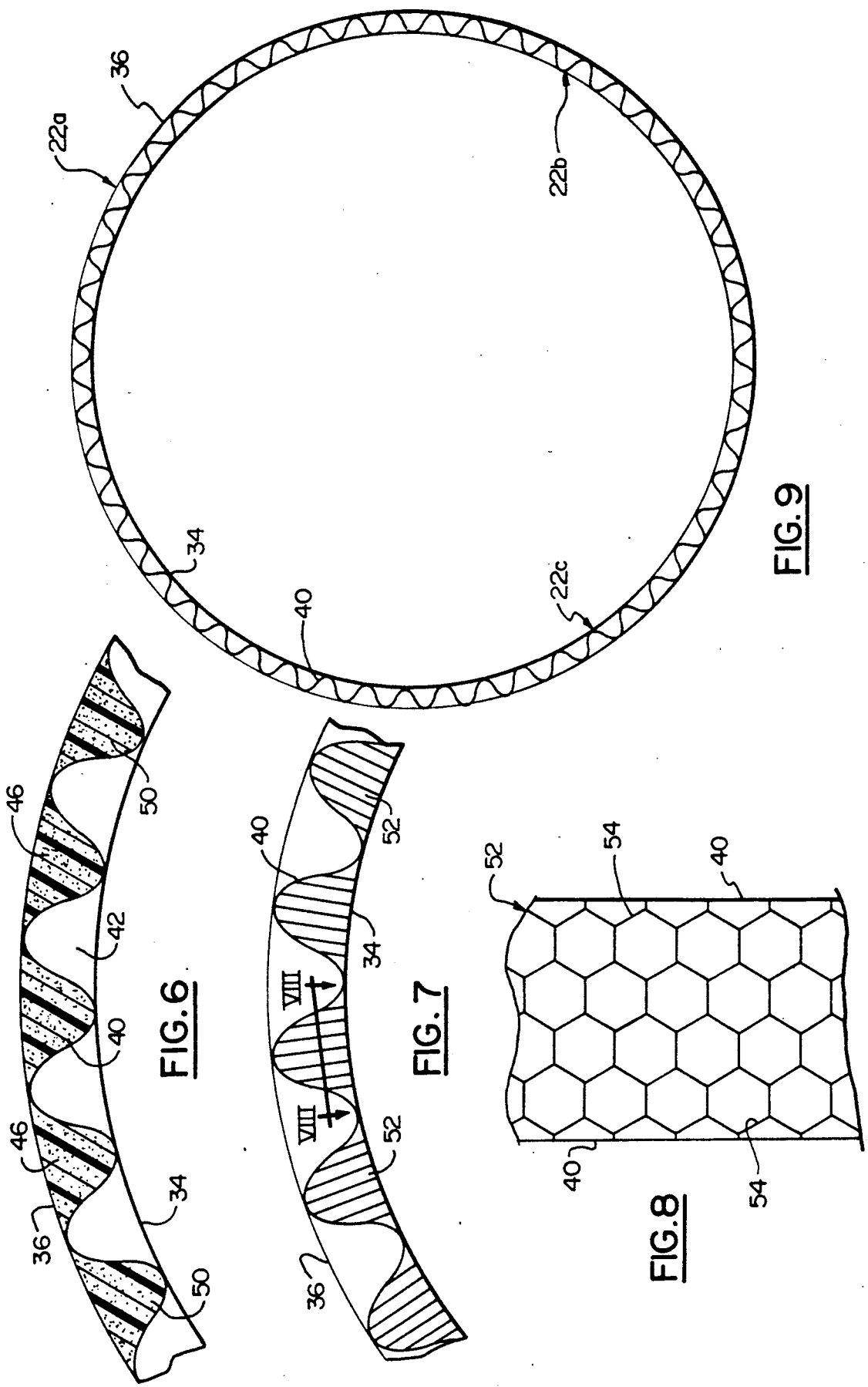

ACOUSTIC LINER

BACKGROUND OF THE INVENTION

This invention generally relates to acoustic liners, and more particularly, to annularly or circumferentially shaped acoustic liners. Even more specifically, the present invention relates to a high efficiency broad band acoustic liner of the type especially well-suited to line the interior of a duct or shroud of a jet engine.

Acoustic liners are employed in many applications to attenuate noises generated by machinery or equipment; and, for instance, jet engines are almost universally provided with sound absorption liners or panels to attenuate sound waves produced inside the engines. One type of sound absorption liner commonly used in jet engines comprises a sound permeable facing sheet, a sound impermeable backing sheet and a honeycomb core interposed between these two sheets. Such devices are generally referred to as laminar absorbers, and one such absorber is disclosed in U.S. Pat. No. 3,166,149.

These prior art panels are simple, strong and light weight, and heretofore have generally produced acceptable results. Government regulations limiting the level or amount of noise that may be emitted from a jet engine are becoming stricter, though, and it may be very difficult for many common types of jet engines to comply with these more stringent noise limits using conventional prior art laminar sound absorbers. A principle reason for this is that most laminar absorbers are able to absorb sound effectively only at certain discrete frequencies, and between these discrete absorption bands, the absorption falls to a very low level.

Various attempts have been made to broaden the frequency range over which laminar absorption panels effectively attenuate sound waves; however, heretofore these attempts have not yielded any commercially practical designs. For example, a broader sound absorption characteristic may be obtained by providing the absorption panel with plural layers of permeable sheets and honeycomb cores, and examples of prior art devices of this general type are shown in U.S. Pat. Nos. 3,439,774; 3,640,357 and 3,670,843. These prior art broad band acoustic liners are bulky and heavy, though, and are difficult to manufacture in a commercially practical manner. Another approach to increasing the frequency range over which laminar absorption panels effectively attenuate noises involves modifying the shape and design of the honeycomb structure, and examples of this approach are found in U.S. Pat. Nos. 4,421,201; 3,913,702 and 3,831,710. These attempts usually result in a complex honeycomb design that also is difficult and expensive to manufacture.

SUMMARY OF THE INVENTION

An object of the present invention is to provide an improved sound absorption panel that is simple and economical to fabricate and that functions effectively over a comparatively wide range of absorption frequencies.

Another object of this invention is to provide an annularly shaped, broad band sound absorption panel that is simple and economical to manufacture.

A further object of the present invention is to provide a high efficiency broad band acoustic resonator and absorption panel for a jet engine, that is simple to manufacture and is well suited for use on a retrofit basis, and that can be used in many conventional jet engine designs.

These and other objectives are attained with an acoustic liner comprising a sound permeable inside plate forming a first closed annulus, and a sound impermeable outside plate forming a second closed annulus located outside of and extending around the first annulus. The inside and outside plates are spaced apart and thus form an annular chamber therebetween; and a core member is secured in this annular chamber, between the inside and outside plates. The core member has the shape of a sine wave form annularly extending around the inside plate, and the core member and the inside plate form a multitude of varying depth sound absorption chambers to attenuate sound waves over a broad band of frequencies.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 6 is similar to FIG. 3 but also shows a bulk sound absorption material inside the acoustic liner.

FIG. 7 is similar to FIG. 3, but also shows a honeycomb structure held inside the acoustic liner.

FIG. 8 is a cross-sectional view through the honeycomb structure, taken along line VIII—VIII of FIG. 7.

FIG. 9 is similar to FIG. 2 and shows how the liner may be comprised of a plurality of sections.

DETAILED DESCRIPTION OF THE PREFERRED EMBODIMENTS

Figure 1:
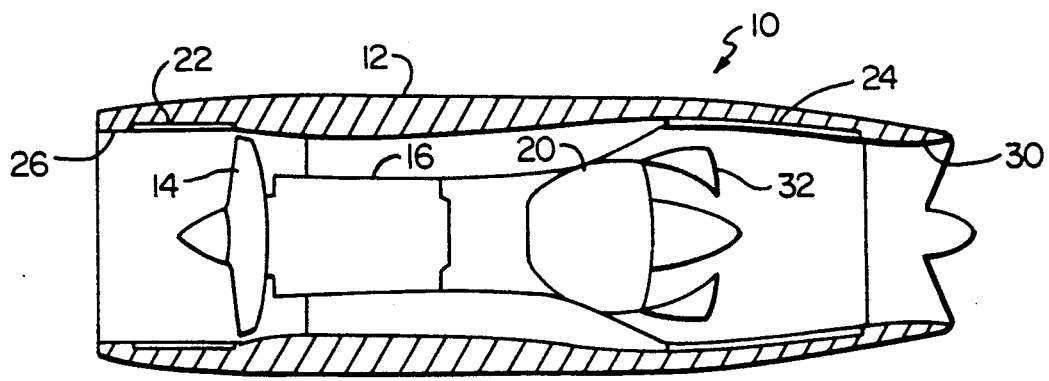
FIG. 1 shows a gas turbine engine including a pair of acoustic liners according to the present invention.

FIG. 1 outlines jet engine 10 generally comprising shroud or duct 12, fan 14, compressor 16, turbine 20 and acoustic liners 22 and 24. In a conventional manner, air is drawn into engine 10 through inlet 26 by rotating fan 14, and this air is compressed by compressor 16 and then heated in a combustion chamber by the combustion of fuel. The heated air is expanded through turbine 20, driving the turbine, which in turn is used to drive fan 14 and compressor 16, and the heated and expanded air is discharged from the engine through outlet 30. The discharged air is at a much a higher velocity than the air drawn into the engine through inlet 26, producing the desired thrust. Preferably, shroud 12, fan 14, compressor 16 and turbine 20 are of conventional construction and operate in a conventional manner, and it is unnecessary to describe these elements further herein.

In the operation of engine 10, significant sound waves are produced both in the forward and rearward sections of the engine. The sound waves in the forward section of the engine are primarily generated by the rotating fan 14, and typically the frequencies of these sound waves are within a relatively narrow band, with the central frequency of that band determined principally by the rotating speed of fan 14. The sound waves in the rearward section of the engine are produced by compressor 16, turbine 20 and the high velocity of air moving through this area of the engine, and typically, the frequencies of these sound waves are distributed over a relatively wide range in a highly irregular manner.

Acoustic liner 22 is secured within a forward area of engine 10 to attenuate sound waves generated in this area of the engine, and acoustic liner 24 is secured within a rearward area of the engine to attenuate sound waves produced therein. Preferably, as shown in FIG. 1, liner 22 extends rearward from a position adjacent inlet 26 to a position immediately forward of fan 14, and liner 24 extends forward from a position adjacent outlet 30 to a location extending around air flow guides 32 of the engine. Liners 22 and 24 are generally identical, and thus only one, liner 22, shown in detail in FIGS. 2 and 3, will be described herein in detail.

Liner 22 includes inside plate 34, outside plate 36 and core member 40. Generally, inside plate 34, commonly referred to as a facing sheet, is sound permeable and forms a first closed annulus; and outside plate 36, commonly referred to as a backing sheet and which preferably is sound impermeable, forms a second closed annulus that extends around and is spaced from the inside plate. The inside and outside plates thus form a closed annular chamber therebetween; and core member 40 is secured in this annular chamber, between plates 34 and 36. The core member forms a sine wave form annularly extending around the inside plate; and in this way, the inside plate and the core member form a multitude of varying depth sound absorption chambers 42 that effectively attenuate sound waves over a broad range of frequencies. In particular, at each point in each chamber 42, sound waves are attenuated in one or more frequency bands, each of which is centered around a particular frequency determined by the radial depth of the sound absorption at that point. Because the depth of each chamber 42 varies significantly, each chamber will effectively attenuate sound waves over a relatively wide range of frequencies.

Figure 2:
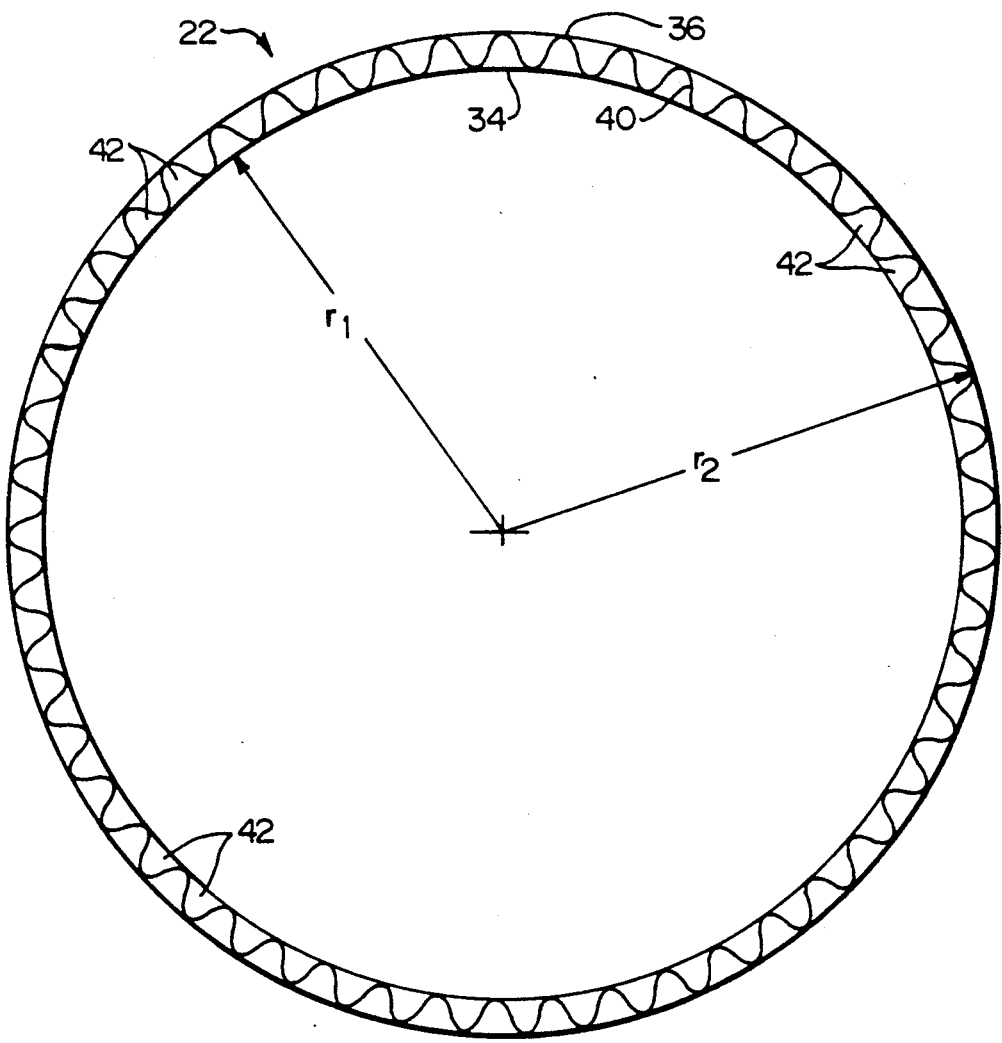
FIG. 2 is a front view of one of the acoustic liners.

With the preferred embodiment of liner 22 shown in FIG. 2, inside plate 34 and outside plate 36 both have substantially circular shapes, with the inside plate radially located inside of and concentric with the outside plate. Moreover, with this preferred liner 22, core member 40 has a uniform wave length, over its entire circumference, with the inside peaks or edges of the wave form engaging the inside plate and with the outside peaks or edges of the wave form engaging the outside plate. In addition, liner 22 has a substantially cylindrical shape, with the inside plate having a substantially uniform radius, $r_1$, over its entire length, and with the outside plate having a substantially uniform radius, $r_2$, over its entire length. Further, the shape of core member 40 is substantially uniform in the axial direction, so that the sound absorption chambers comprise axial channels extending along the entire length of the liner.

The inside plate 34 may be fabricated from metal, plastic, ceramic, or other suitable materials; and, for instance, the inside plate may comprise a single discretely perforated metal sheet, or a combination of such a metal sheet and a porous fibrous layer, or a porous composite weave material bonded to a woven wire mesh. Depending on the specific environment in which the acoustic liner is used, it may be desirable to provide the radially inside surface of the inside plate with a corrosion resistant coating. The outside plate 36 may also be fabricated from metal, plastic, ceramic or other suitable materials; and for example, the outside plate may comprise a solid aluminum plate.

Core member 40 may be made from any suitable material such as plastic, paper, metal, ceramic or from a woven composite material, and for instance, the core member may be fabricated from a flat sheet of aluminum that is bent into the desired sine wave shape. With the embodiment of liner 22 illustrated in FIGS. 2 and 3, the core member is constructed from a sound impermeable material, although, as discussed below, the core member may also be formed from a sound permeable material.

Figure 4:
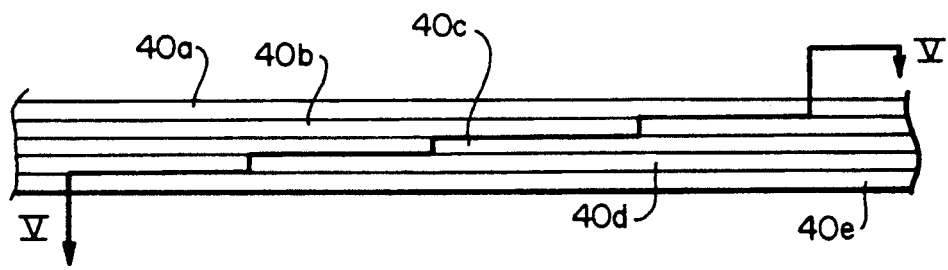
FIG. 4 is a further enlarged view of a portion of a core member of the acoustic liner, particularly showing the laminar construction thereof.
Figure 5:
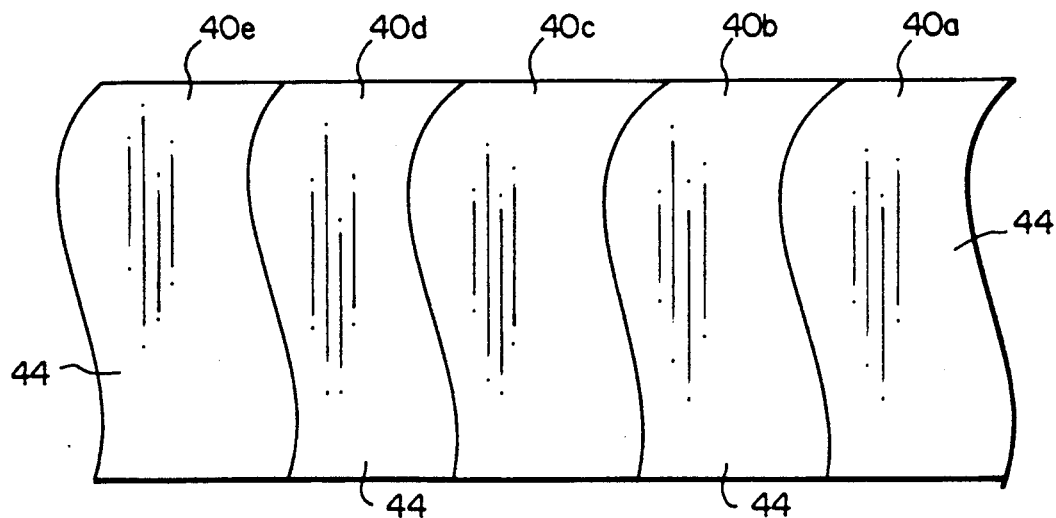
FIG. 5 is a top view of the portion of the core member illustrated in FIG. 4, with various layers partially broken away.

FIGS. 4 and 5 illustrate one preferred construction of the core member, in which this member is comprised of multiple layers 40a-e of a composite material that, in turn, comprises epoxy reinforced carbon fibers 44. The fibers in each layer 40a-e are aligned in a particular direction; and the individual layers are placed one on top of another with the fibers of the different layers aligned in a variety of different directions to produce a composite material that has a high strength in all directions. For example, the individual layers 40a-e of core member 40 may be formed in the preferred sine wave form and then secured together to form the core member. It should be noted that, while FIGS. 4 and 5 illustrate five individual layers, in practice it may be preferred to form the core member 40 from more layers, such as ten layers.

Core member 40 may be secured in the annular chamber between plates 34 and 36 in any suitable manner, although preferably the radially inside peaks or edges of the core member abut against and are secured to inside plate 34, and the radially outside peaks or edges of the core member abut against and are secured to outside plate 36. The preferred technique for securing the core member in place generally depends on the material or materials from which that core member is made. For instance, if the core member is made from epoxy reinforced carbon fibers, then the inside and outside edges of the core member may be secured respectively, to the inside and outside plates by an adhesive. If the core member is made from aluminum, it may be bolted, welded or mechanically interlocked to the inside and outside plates of the liner 22.

Figure 3:
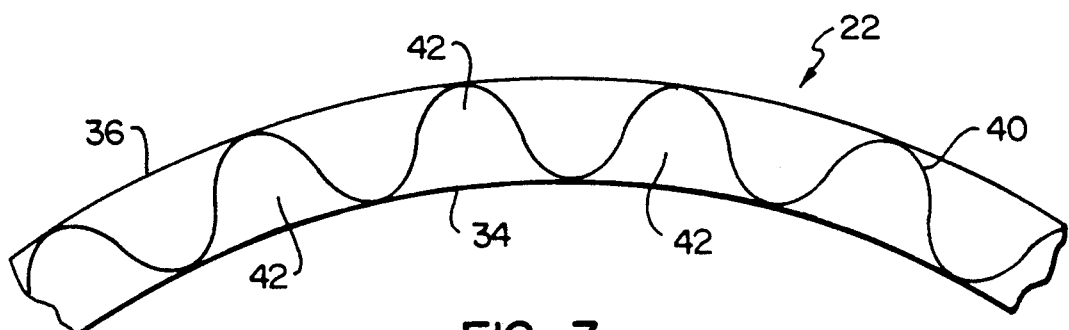
FIG. 3 is an enlarged front view of a portion of the acoustic liner.

Various modifications may be made to the basic construction of liner 22 shown in FIGS. 2 and 3 to improve the sound attenuation characteristics of the acoustic liner. For example, with reference to FIG. 6, core member 40 may be made from sound permeable material, and chambers 46, which are formed by the core member and outside plate 36, may be filled with a bulk acoustic absorbing material 50. In this way, chambers 42 and chambers 46 of liner 22 are both used to attenuate sound waves. Any suitable bulk acoustic material may be used, and for example, the material may be of the type identified by the trademark Kevlar.

Alternatively, as depicted in FIG. 7 and 8, sound absorption chambers 42 may be filled with honeycomb structures 52. Preferably, the walls 54 of each honeycomb structure 52 radially extend completely between inside plate 34 and core member 40, and each channel 42 is filled with a respective one of the honeycomb structures. These structures, first, preferably prevent or inhibit sound waves from moving axially through the interior of liner 22, and second, strengthen the liner, both in the axial and radial directions. Honeycomb structures 52 may have any commonly used honeycomb core design and may be made of any commonly used honeycomb material, and for instance, the structures may have cell sizes in the range of ⅛ to ½ inch. Honeycomb structures 52 are preferably secured to both inside plate 34 and core member 40, and this may be done in any suitable manner such as by an adhesive. In addition, if desired, the length of the sine waves formed by core member 40 may vary over the circumference of the core member. For instance, this wave length may be relatively small over one portion of the core member, and comparatively large over another portion of the core member.

As previously mentioned, liner 24 is substantially identical to liner 22. The principle differences between these liners relate to various parameters, such as the radial thickness of core member 40, the wave length of the sine pattern of the core member, and the specific materials from which the elements of the liner are made. As will be appreciated by those of ordinary skill in the art, these parameters are selected for each liner depending on the specific application in which the liner is used, and in particular, to help achieve the desired sound attenuation characteristics for the liner.

Acoustic liner 22 may be assembled and secured in jet engine 10 in any suitable manner. With reference to FIG. 9, with one preferred technique, the liner is comprised of three sections 22a, b and c that are formed separately and then connected together as they are placed in position in engine 10. Each of these liner sections includes a respective one segment of inside plate 34, outside plate 36 and core member 40 so that when these sections are connected together, they form the complete liner illustrated in FIG. 2. These liner sections may be secured in jet engine 10 and to each other in any suitable procedure, such as by bonding, welding, bolts or by mechanical interconnections.

A principle advantage of liner 22 is that it is comparatively simple and inexpensive to manufacture. To elaborate, each section 22a, b and c of the liner can be made by simply forming a sheet of aluminum or other suitable material into the desired sine wave shape to form a segment of the core member 40, and then placing this sine wave form between segments of the inside and outside plates. This procedure does not require any special cutting, notching or futher shaping of the core member and is not expensive or time consuming. At the same time, this technique produces the desired multiple, varying depth sound absorption chambers. Moreover, this manufacturing procedure places very few limitations on various parameters of liner 22—such as the radial thickness of the core member and the specific materials from which the core member and inside plate 34 are made—which may be changed to vary the sound attenuation characteristics of the liner, so that this procedure can be used to construct different liners that effectively attenuate sound waves over various, broad frequency ranges.

As described above, acoustic liners 22 and 24 have been described as being used adjacent the inlet and outlets of a jet engine. As will be understood by those of ordinary skill in the art, an acoustic liner embodying the present invention can be applied equally well to other parts of a jet engine where noise attenuation is desired or required. Indeed, this invention is not restricted to jet engines, but may also be used in any duct in which gas is flowing, or for enclosing any space in which sound waves are generated.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. An acoustic liner comprising:
   a sound permeable inside plate forming a first closed annulus and defining a liner axis;
   a sound impermeable outside plate forming a second closed annulus located outside of and extending around the first closed annulus, the inside and outside plates being spaced apart and forming an annular chamber therebetween; and
   a core member secured in the annular chamber, between the inside and outside plates, the core member extending axially along and around the liner axis and forming a sine wave form in the annular direction around said axis, said sine wave form extending completely around the liner axis, wherein the core member and the inside plate form a multitude of varying depth sound absorption chambers to attenuate sound waves over a broad range of frequencies; and
   wherein the core member has an axial length; and in any plane perpendicular to the liner axis and along said axial length, the core member forms a sine wave form having a generally uniform height and wave length.

2. An acoustic liner according to claim 1, wherein:
   the core member includes a multitude of layers of reinforced carbon fibers; and
   the fibers of each layer are generally aligned in a respective one direction.

3. An acoustic liner according to claim 1, wherein:
   the closed annular chamber defines an axis; and
   the core member forms a multitude of inside and outside axially extending edges.

4. An acoustic liner according to claim 3, wherein:
   the inside edges of the core member abut against the inside plate and extend axially therealong; and
   the outside edges of the core member abut against the outside plate and extend axially therealong.

5. An acoustic liner according to claim 4, wherein:
   the inside edges of the core member are secured to the inside plate; and
   the outside edges of the core member are secured to the outside plate.

6. An acoustic liner according to claim 5, wherein:
   the inside edges of the core member are adhesively secured to the inside plate; and
   the outside edges of the core member are adhesively secured to the outside plate.

7. In a jet engine having an axially and circumferentially extending shroud defining an engine axis, a fan rotatably mounted inside the shroud, and a compressor and a turbine secured within the shroud, an acoustic liner circumferentially extending around the engine axis to attenuate sound waves generated in the engine, the acoustic liner comprising:
   a sound permeable inside plate circumferentially extending completely around the engine axis;
   a sound impermeable outside plate circumferentially extending completely around the engine axis, concentric with and radially spaced from the inside plate; and a core member secured between the inside and outside plates, extending axially along and around the liner axis and forming a sine wave form in the annular direction around said axis, said sine wave form extending completely around the liner axis, wherein the core member and the inside plate form a multitude of varying depth sound absorption chambers to attenuate sound waves over a broad range of frequencies; and wherein the core member has an axial length; and in any plane perpendicular to the engine axis and along said axial length, the core member forms a sine wave form having a generally uniform height and wave length.

8. An acoustic liner according to claim 7, wherein: the core member is sound impermeable and is formed from a metal sheet.

9. An acoustic liner according to claim 8, wherein: the core member includes a multitude of inside and outside axially extending edges; the inside edges are secured to the inside plate; and the outside edges are secured to the outside plate.

10. An acoustic liner according to claim 8, wherein the core member is sound impermeable and comprises a multitude of layers of reinforced carbon fibers.

* * * * *